United States Patent
Whelan et al.

[11] 3,804,261
[45] Apr. 16, 1974

[54] APPARATUS FOR GRAVITY SEPARATION OF IMMISCIBLE FLUIDS

[75] Inventors: James A. Whelan, Alexandria; James R. Henry; Horace H. White, both of Pineville, all of La.

[73] Assignee: Pineville Kraft Corporation, Pineville, La.

[22] Filed: Aug. 28, 1972

[21] Appl. No.: 284,002

[52] U.S. Cl.................. 210/519, 210/528, 210/532
[51] Int. Cl............................................. B01d 17/02
[58] Field of Search....... 210/83, 84, 511, 513, 528, 210/532

[56] References Cited
UNITED STATES PATENTS
3,313,725  4/1967  Tsuda et al. ...................... 210/83 X
2,702,786  2/1955  Hakes ................................ 210/513
1,310,051  7/1919  Blomfield ....................... 210/528 X
3,081,880  3/1973  Hearne et al. ...................... 210/525

Primary Examiner—Samih N. Zaharna
Assistant Examiner—Robert G. Mukai
Attorney, Agent, or Firm—Sughrue, Rothwell, Mion, Zinn & Macpeak

[57] ABSTRACT

Tall oil soap is separated from black liquor used in the Kraft production process by uniformly introducing the mixed liquids into the bottom of a large outer container to flow upwardly and having the heavier black liquor go through a zone of zero upward velocity and flow downward for discharge from the bottom of an inner baffle. This arrangement prevents short circuiting of the incoming mixed liquids to the black liquor outlet. The tall oil soap will accummulate at the top of the containing vessel where it is skimmed in a conventional manner.

2 Claims, 3 Drawing Figures

PATENTED APR 16 1974
3,804,261
FIG.1
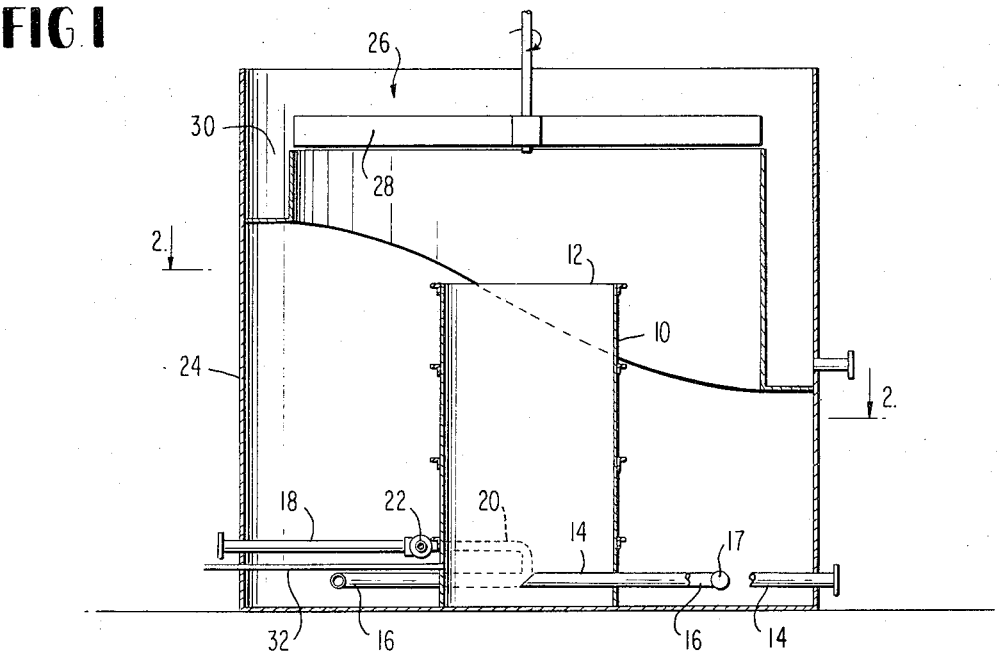
FIG.2
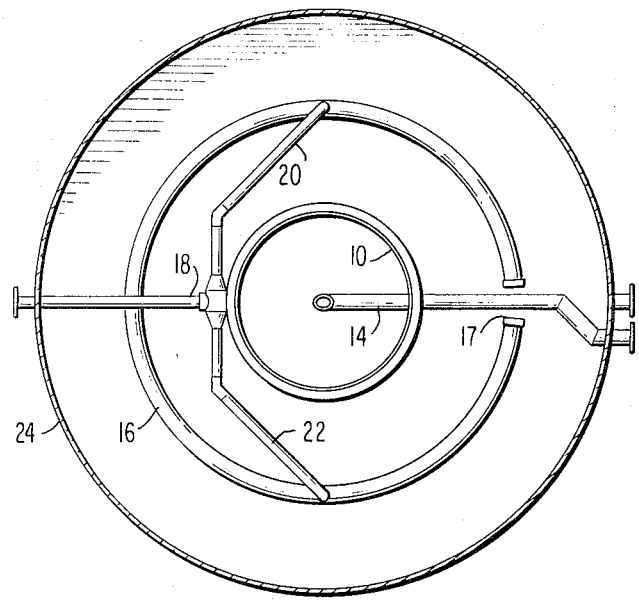
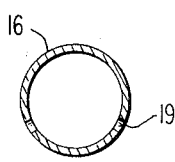
FIG.3

APPARATUS FOR GRAVITY SEPARATION OF IMMISCIBLE FLUIDS

BACKGROUND OF THE INVENTION

1. Field of the Invention

This invention relates to an apparatus for the separation of tall oil soap from black liquor used in the Kraft production process common in the pulp and paper industry although the principles of this invention can be utilized for gravity separation of any two immiscible liquids.

2. Prior Art

In the Kraft production process commonly used in the pulp and paper industry spent black cooking liquor from a digestor contains tall oil soap which is a valuable chemical by-product and can be recovered to produce crude tall oil. The tall oil soap is lighter than the black liquor and is commonly separated by various gravity separation means such as decanter-type skimmers. These skimmers presently used in this art vary from open tanks with launder-type soap collectors to tanks with elaborate vertical baffles. A common prior art tank is a vertical tank with a feed header at the bottom and a liquor take-off opposite the feed header. Typical separation efficiencies, measured as a percent of possible recovery, range from fifty to seventy-five percent using the presently available separators.

SUMMARY OF THE INVENTION

This invention improves the separation of sulphate tall oil soap from the mixture of this soap in black liquor. The invention utilizes gravity separation of the two immiscible fluids but prevents short circuiting of the incoming fluids to the discharge of the skimming vessel and causes the incoming fluids to pass through an unagitated zone of zero upward velocity.

More specifically, the mixture of liquids to be separated is fed to the lower end of a large skim tank through a ring header or the like to provide uniform distribution of the tall oil soap in the black liquor. These liquids flow upwardly in the outer vessel. There is also provided an inner vertical baffle tank open at the top which is otherwise not in fluid communication with the outer tank. At the time the mixture of tall oil soap and black liquor flowing upwardly without agitation reaches the level of the top of the inner vessel, the soap has an upward velocity and flow direction. The black liquor is of course heavier. The soap will continue to flow upwardly where it is raked off or otherwise skimmed off by known means such as a launder collecting device. The black liquor reaches a point of zero upward velocity adjacent the top of the inner tank and will begin to displace the liquor flowing out of the discharge pipe of the inner tank. The inner tank may also have a fill line so that it may be filled at the same time the outer tank is filled to relieve pressure during start up.

BRIEF DESCRIPTION OF THE DRAWINGS

FIG. 1 is a side sectional elevation view of the separation apparatus of this invention.

FIG. 2 is a plan sectional view taken along line 2—2 of FIG. 1.

FIG. 3 is a detailed sectional elevation view of the incoming feed distributor.

DETAILED DESCRIPTION OF THE PREFERRED EMBODIMENT

The apparatus of this invention includes an inner baffle tank or container 10 which is liquid tight but open at its top 12. An outlet pipe 14 extends from near the bottom and center of the tank 10 outwardly as shown in FIG. 1.

Surrounding the inner baffle tank 10 is a distribution header 16 connected to an inlet pipe 18 by branch lines 20 and 22. This inlet header may have end caps 17 as it is on the same level as outlet pipe 14. The header 16 has means for uniformly distributing the incoming liquids, such as two rows of staggered holes or nozzles 19 as shown in FIG. 3. An outer tank 24 which is also fluid tight and extends above the level of the inner tank.

At the top of the outer tank there is a conventional launder means 26 which functions as a skimmer with a rotating paddle 28 which gradually forces the lighter material, namely the tall oil soap, into the circumferential overflow channel 30.

A fill line 32 may be provided for filling the inner baffle tank during start up.

In operation a mixture of tall oil sulphate soap in black liquor from the digestor comes in the inlet line 18 through the branch lines 20, 22 to the inlet header 16 and is uniformly distributed in the space between the outer and inner tanks. Assuming start up, black liquor is also introduced to the inner tank through fill line 32 at a rate such that the inner tank fills the same as the outer tank and there is no differential pressure on the walls of the inner baffle cylinder. After the mixture of tall oil soap in black liquor reaches the level of the top of the inner tank, it has an upward velocity and the tall oil soap will continue moving upwardly to the top of tank 24 where it is raked off by the launder 26. However, the black liquor is being removed from the bottom of the inner tank 10 through line 14. Thus, the black liquor must pass through a zone of zero upward velocity above the level of the open top 12 of baffle tank 10 and will flow downward into the inner baffle tank to be removed at the bottom.

Pilot plant studies have shown that this arrangement increases soap separation efficiencies between 10 to 25 percentage points above prior art skimmers most commonly used in production processes. Utilizing the present skimmer without the internal tank 10 or the uniform distribution header 18, however, gives about the same result as the prior art. Separation efficiencies of up to 93 percent have been achieved utilizing apparatus described above in which there is a 31 foot high outer tank of about 32 feet diameter, an 18 foot high inner tank of about 10 foot diameter, an eight inch perforated liquid header with two rows of 1⅞ inch holes on 4¾ inch staggered centers and a 10 inch liquid outlet with an 8 inch liquid inlet.

Other varients will be apparent to those skilled in the art. For example, the tanks 10 and 24 need not be cylindrical but can be square or rectangular in plan. Also, the soap skimming means at the top of tank 24 need not be a launder but could be other known means.

We claim:

1. Apparatus for gravity separation of immiscible liquids having different specific gravities, the apparatus comprising: a larger outer container for holding liquid to be separated, a smaller inner baffle container positioned within the outer container to leave a space therebetween, the inner container having a height less than a normal liquid level in the outer container and the inner container being open at the top for free fluid communication with liquid in the outer container, a header extending substantially around the inner baffle container in the space between the two containers, the header having regularly spaced openings for uniformly distributing a mixture of immiscible liquids of different specific gravities in the lower portion of the outer container below the level of the inner container and in the space between the containers, means for withdrawing a separated heavier liquid from the bottom of the inner container, skimmer means at the top of the larger outer container above the liquid level of the inner container for skimming the lighter material which separates from the heavier material, and a fill line leading to the inner container for filling the inner container at the same time the space between the containers is filled during start up to relieve pressure.

2. An apparatus as in claim 1 wherein the containers are both cylindrical and concentric.

* * * * *